United States Patent
Zagorevsky et al.

[11] 3,901,884
[45] Aug. 26, 1975

[54] BASES AND SALTS OF 2-AMINOMETHYAL-4,4-DIALKYL-4H-1,3-BENZOXAZINES AND METHOD FOR PREPARING SAME

[76] Inventors: Vladimir Alexeevich Zagorevsky, ulitsa Obrucheva, 14, kv. 76; Sergei Mikhailovich Kljuev, ulitsa Udaltsova, 14, kv. 195; Eduard Alexandrovich Bendikov, 1 Mosfilmovsky pereulok, 4 "a", kv. 34; Klara Ivanovna Lopatina, Profsojuznaya ulitsa, 36/9 kv. 81, all of Moscow, U.S.S.R.

[22] Filed: Apr. 25, 1973

[21] Appl. No.: 354,502

[52] U.S. Cl............................ 260/244 R; 424/248
[51] Int. Cl............................................. C07d 87/20
[58] Field of Search..................................... 260/244

[56] References Cited
UNITED STATES PATENTS
3,058,980   10/1962   Berg et al. ...................... 260/244

*Primary Examiner*—Harry I. Moatz
*Attorney, Agent, or Firm*—Waters, Schwartz & Nissen

[57] ABSTRACT

Bases and salts of 2-aminomethyl-4,4-dialkyl-4H-1,3-benzoxazine have the formula

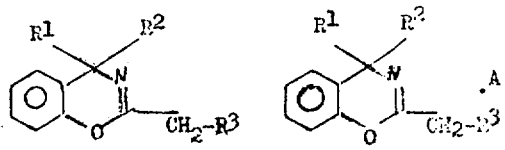

where $R^1$ and $R^2$ are alkyl, $R^3$ is a radical of aliphatic primary or secondary amines, or cyclic secondary amines, and A is a mineral or an organic acid. Said compounds have biologically active properties. Said bases are prepared by interacting 2-halide-methyl-4,4-dialkyl-4H-1,3-benzoxazines with aliphatic primary or secondary amines or cyclic secondary amines. Said bases can be prepared also by thermal cyclization of compounds having the formula

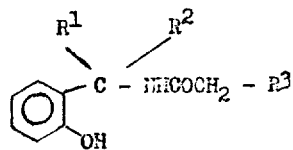

where $R^1$ and $R^2$ are alkyl and $R^3$ is amino group. Their salts are prepared by reacting mineral or organic acids with said bases.

4 Claims, No Drawings

BASES AND SALTS OF 2-AMINOMETHYAL-4,4-DIALKYL-4H-1,3-BENZOXAZINES AND METHOD FOR PREPARING SAME

This invention relates to bases and salts of 2-aminomethyl-4,4-dialkyl-4H-1,3-benzoxazines and to a method for preparing same.

According to the invention, said substances have the following formulas:

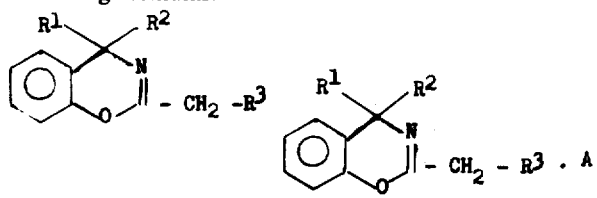

where $R^1$ and $R^2$ are alkyl, $R^3$ is a radical of aliphatic primary or secondary amines, or cyclic secondary amines, and A is a mineral or an organic acid which forms non-toxic pharmacologically active salts.

These are entirely new substances which have not been described in the literature.

The proposed bases are colorless mobile liquids, and the salts are white crystalline substances, more or less soluble in water, alcohol and some other organic solvents, for example, benzene, toluene, acetone.

The substance

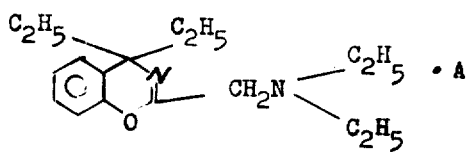

where A is HCl or $C_2H_2O_4$, is given a conventional name "benoxen". It possesses a certain complex of pharmacological properties, the main of which are (a) vasodilatory and spasmolytic, (b) antiarrhythmic, and (c) β-adrenoblocking.

a. Vasodilatory and spasmolytic action

Benoxen (1 - 3- 5 mg/kg body weight) possesses the power to reduce the tone in the coronary and cerebral vessels. The preparation intensifies the blood flow in the heart and cerebral vessels on an average of 60 – 80 per cent. Unlike papaverin, it does not increase, but substantially decreases the oxygen consumption of the myocardium, which adds to the oxygen reserve of the heart.

Benoxen shows a high therapeutic activity in spasms of the coronary and cerebral vessels of neurogenic etiology where papaverin and intensain are of low effect. The preparation produces no α-adrenolytic, sympatolytic or cholinolytic action. Its spasmolytic power is based on the myotropic properties and the power to act on the central circulatory regulation.

b. Antiarrhythmic action

Benoxen ($1.10^{-6}$ g/ml) raises the threshold of excitation of a rabbit heart. With respect to its effect, benoxen is similar to quinidine, and much superior to novocainamine.

Benoxen is highly efficaceous in artificial heart arrhythmia induced by adrenalin, isoproterenol, or caused by introducing KCl into the cerebral ventricle, or by ligation of the coronary vessels. The preparation is less effective with the aconitine-induced arrhythmia.

c. β-Adrenoblocking action

Unlike inderal, benoxen produces a selective effect of β-adrenoreactive structures of the myocardium. The preparation does not block β-adrenoreceptors of smooth muscles and does not therefore (in contrast to the majority substances belonging to this group) increase the tone of the broncheal muscles. Benoxen ($1.10^{-6}$ g/ml) blocks the effect produced by isoproterenol and produces a negative inotropic and chronotropic action on an isolated auricle of a guinea pig. The effect of the preparation on the heart of an intact animal is much better than that of inderal, which inhibits the contractile function of the myocardium. In these conditions, benoxen prolongs the diastolic dilation of the heart and increases the systolic discharge.

The preparation has turned a highly efficaceous preparation in treating experimental ischemic changes in the heart muscle. It removes the circulatory disorders in the heart and the ischemic ECG changes produced by the action of isoproterenol, adrenalin, or by introducing KCl into the cerebral ventricle, or else by ligation of the coronary vessels. The therapeutic range of benoxen is sufficiently wide: the $LD_{50}$ of the preparation is 144 mg/kg body weight, while its effective doses are 1 - 3- 5 mg/kg.

Thus, it is possible to draw a conclusion that the preparation benoxen has a wide spectrum of action on the cardiovascular system. The combination of the spasmolytic, vasodilatory, antirhythmic and β-adrenoblocking action of the preparation makes it superior to the known antianginal preparations. Benoxen possesses a selective β-adrenolytic action and produces no side effects such as increased tone of the broncheal musculature, peripheral resistance of the vessels, and the inhibition of the contractive function of the myocardium, which are characteristic of most β-adrenoblocking substances (inderal). Benoxen is a highly active and low-toxic cardiovascular preparation possessing a wide therapeutic range.

The preparation can be recommended for treating stenocardia, myocardial infarction, disorders in the cerebral circulation, paroxysmal tachicardia.

The substances having the formulas

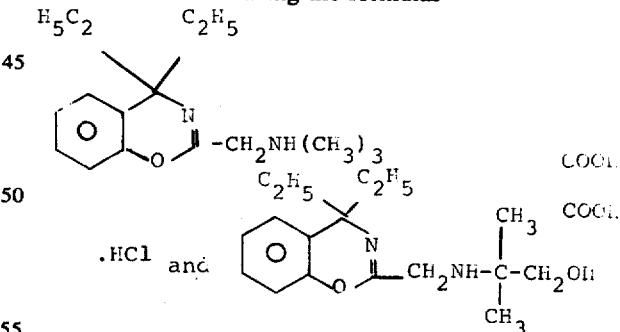

also possess similar properties, namely, vasodilatory and hypotensive properties. They reduce the work of the heart mainly on account of the negative chronotropic effect. However, with respect to its pharmacological activity, benoxen is more effective, and it is more advantageous in realization on an industrial scale.

According to the invention, two versions of the embodiment of the method for preparing the said bases are proposed. One version of preparing the base, according to the invention, consists in the interaction between 2-halide methyl-4,4-dialkyl-4H-1,3-benzoxazine and primary or secondary aliphatic amines, or cyclic secondary amines.

It is desirable that the interaction between the said components should be carried out at a temperature of the boiling point of the amine, since this accelerates the reaction. The molar ratio of 2-chloromethyl-4,4-dialkyl-4H-1,3-benzoxazine to the said amine is 1:8–10.

The reaction between the said components can be carried out in a medium of organic solvents at a temperature of the boiling point of the chosen solvent. It is recommended that the molar ratio of the said benzoxazine to the said amine should be maintained 1:2. This condition shortens also the time of the reaction.

Examples of such amines are dimethylamine, diethylamine dipropylamine, dibutylamine, piperidine, morpholine, tertiary butylamine, and other similar amines.

Any organic solvent inactive with respect to the starting components, such as benzene, toluene, xylene, can be used as organic solvents.

The practical embodiment of the proposed method is very simple. The starting components taken in the specified ratio interact at a temperature of the boiling point of the amine or at the boiling temperature of the organic solvent under normal pressure. On the termination of the reaction, the precipitate of the salt of the chosen amine is separated on a filter, and the base of the above formula is distilled from the filtrate.

The advantage of the method for preparing the bases consists in the availability of the starting amines. As far as the halide-substituted benzoxazines are concerned, they are prepared from such popular and readily available substances in the pharmaceutical industry as salicylic acid and its esters.

Another version of the method for preparing the bases according to the invention consists in the thermal cyclization of the compound having the general formula

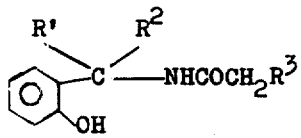

where $R'$ and $R^2$ are alkyl, and $R^3$ is amino group.

The thermal cyclization can be effected at the boiling temperature of the substance and under a residual pressure of from 1 – 5 mm Hg. The thus formed product is isolated by distillation under the specified residual pressure. In order to carry out the method, it is only sufficient to charge the starting materials in the reaction kettle, in which they are melted at the boiling temperature and a residual pressure of 1–5 mm Hg, and distilled.

This version of the embodiment of the method is also very simple with respect to the process equipment and allows the product to be obtained with a yield of up to 71 percent.

As mineral or organic acids act on the prepared bases in a medium of an organic solvent, their salts are prepared. The exemplary acids, that can be used for the purpose are hydrochloric, sulfuric, tartaric, oxalic, maleic, picric, lactic and naphthalene-1,5-disulfonic acid. Diethyl and dibutyl ethers can be used as the organic solvents.

For a better understanding of the invention, the following examples are given by way of illustration.

EXAMPLE 1

Preparing 2-piperidinomethyl-4,4-diethyl-4H-1,3-benzoxazine 3.6 g (0.015 mole) of 2-chloromethyl-4,4-diethyl-4H-1,3-benzoxazine, 2.5 ml (0.03 mole) of piperidine and 20 ml of toluene are boiled for 10 hours. The formed precipitate of piperidine hydrochloride is separated by filtration. Toluene is removed by distillation, and the residue is distilled in vacuum to collect the fraction boiling at temperatures from 123° to 124°C (0.06 mm Hg). The resultant product is 2.8 g of 2-piperidine methyl-4,4-diethyl-4H-1,3-benzoxazine, which is 65.1 percent of theory.

Found, in percent: C, 75.43, 75.44; H, 9.36, 9.44; N, 9.35, 9.45. $C_{18}H_{26}N_2O$.

Calculated, in percent: C, 75.48; H, 9.15; N, 9.78.

2-piperidine methyl-4,4-diethyl-4H-1,3-benzoxazine hydrochloride is prepared from the base in diethyl ether with hydrogen chloride. Melting point, 193° – 194°C (with decomposition).

Found, in percent: Cl, 11.07, 11.15; $C_{18}H_{26}N_2O \cdot HCl$.

Calculated, in percent: Cl, 10.98.

EXAMPLE 2

Preparing 2-diethylaminomethyl-4,4-diethyl-4H-1,3-benzoxazine 4.6 g (0.02 mole) of 2-chloromethyl-4,4-diethyl-4H-1,3-benzoxazine and 14 g (0.2 mole) of diethylamine are boiled for 6 hours. The formed precipitate of diethylamine hydrochloride is separated by filtration, the excess of diethylamine is distilled off, and the residue is then distilled in vacuum at 122° – 123°C (2 mm Hg) to prepare 3.2 g of 2-diethyl-aminomethyl-4,4-diethyl-4H-1,3-benzoxazine, which is 60.3 percent of theory. The boiling point of the product is 122° – 123°C (2 mm Hg), $n_D^{21}$ 1.5100, I-R spectrum in $CCl_4$, C = N 1691 $cm^{-1}$.

Found, in percent: C, 74.29, 74.52; H, 9.49, 9.55; N, 10.38; 10.44. $C_{17}H_{26}N_2O$.

Calculated, in percent: C, 74.40; H, 9.55; N, 10.20.

2-diethylaminomethyl-4,4-diethyl-4H-1,3-benzoxazine hydrochloride is prepared by the procedure as described in Example 1. The melting point is 105° – 106°C.

Found, in percent: Cl, 11.50; 11.63; $C_{17}H_{26}N_2O \cdot HCl$.

Calculated, in percent: Cl, 11.40.

2-diethylaminomethyl-4,4-diethyl-4H-1,3-benzoxazine oxalate has the melting point at 135.5° – 136°C.

Found, in percent: C, 62.76, 62.62; H, 7.82, 7.75; N, 7.90, 7.93; $C_{19}H_{28}N_2O_5$.

Calculated, in percent: C 62.62, H 7.74, N 7.68.

EXAMPLE 3

Preparing 2-tert. butylaminomethyl-4,4-diethyl-4H-1,3-benzoxazine 2.4 g (0.01 mole) of 2-chloromethyl-4,4-diethyl-4H-1,3-benzoxazine and 7.3 g (0.1 mole) of tert. butylamine are boiled for 6 hours. The process similar to that described above yields 1.7 g of 2-tert. butylaminomethyl-4,4-diethyl-4H-1,3-benzoxazine, which is 63 percent of theory. The boiling point is 132° – 134°C (3 mm Hg), $n_D^{20}$ 1.5110.

Found, in percent of theory: C, 74.67, 74.40; H, 9.54, 9.79; N, 10.11, 10.27; $C_{17}H_{26}N_2O$.

Calculated, in percent: C, 74.40; H, 9.55; N 10.20.

The m.p. of the oxalate is 189°–190°C (with decomposition).

Found, in percent: C, 62.50, 62.46; H, 7.80, 7.78; N, 8.08, 8.03, $C_{17}H_{26}N_2O \cdot C_2O_4H_2$.

Calculated, in percent: C, 62.61, H, 8.14, N, 8.08.

EXAMPLE 4

Preparing 2-dipropylaminomethyl-4,4-diethyl-4H-1,3-benzoxazine

The reaction is carried out by the procedure described in Example 2, except that dipropylamine is used instead of diethylamine. The yield of the base is 50 percent of theory.

Found, in percent: C, 75.38, 75.17; H, 10.00, 9.98; N, 9.24, 9.26; $C_{19}H_{30}N_2O$.

Calculated, in percent: C, 75.45; H, 9.99; N 9.26.

2-dipropylaminomethyl-4,4-diethyl-4H-1,3-benzoxazine oxalate is prepared by reacting the said base with oxalic acid in dibutyl ether; m.p. 126°–127°C.

EXAMPLE 5

Preparing 2-tert. hydroxybutylaminomethyl-4,4-diethyl-4H-1,3-benzoxazine oxalate The base is prepared by a procedure described in Example 2 except that 2-amino-2methyl-1-propanol is used instead of diethylamine. The oxalate is prepared by acting on the base with oxalic acid. The melting points is 134°–135°C (with decomposition).

Found, in percent: C, 58.44, 58.16; H, 7.97, 7.90; N, 6.81; 6.85; $C_{19}H_{28}N_2O_6 \cdot \frac{1}{2}H_2O$.

Calculated, in percent: C, 58.59; H, 7.51; N, 7.19.

EXAMPLE 6

Preparing 2-diethylaminomethyl-4,4-diethyl-4H-1,3-benzoxazine 1.1 g (0.0037 mole) of N-(diethylaminoacetyl)-α,α-diethyl-o-hydroxybenzylamine is placed into a distillation flask, heated in vacuum to the melting point, and the substance is distilled at a temperature range from 122° to 125°C under a residual pressure of 22 mm Hg. Petroleum ether is added to the distillate and the mixture is allowed to stand overnight in the cold. The solution is then separated on a filter from a small amount of the starting substance which falls out as a precipitate, the solvent is distilled off, and the residue is then distilled in vacuum. The resultant product is 0.7 g of the substance having the boiling point at 122°–123°C (2 mm Hg), which is 67.9 percent of theory. $n_D^{20}$ 1.5100. The identification of this substance is described in Example 2.

We claim:

1. A 2-aminomethyl-4,4-dialkyl-4H-1,3-benzoxazine in the form of a base having the formula

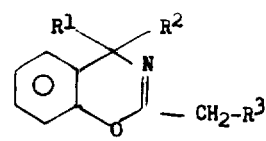

or in the form of a salt having the formula

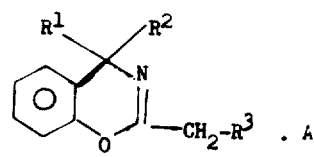

where $R^1$ and $R^2$ are ethyl and $R^3$ is diethylamino and A is an acid selected from the group consisting of hydrochloric, sulfuric, tartaric, oxalic, maleic, picric, lactic and naphthalene-1,5-disulfonic acids.

2. A benzoxazine salt of the base according to claim 1 wherein A is hydrochloric acid.

3. A benzoxazine salt of the base according to claim 1 wherein A is oxalic acid.

4. A method for preparing a base according to claim 1 comprising the thermal cyclization of a compound having the formula

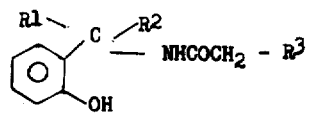

where $R^1$ and $R^2$ are ethyl and $R^3$ is diethylamino, wherein the cyclization is carried out at the boiling point of said compound under a residual pressure of 1–5 mm Hg.

* * * * *